(12) United States Patent
Sivakumar et al.

(10) Patent No.: US 11,202,130 B1
(45) Date of Patent: Dec. 14, 2021

(54) OFFLINE VIDEO PRESENTATION

(71) Applicant: INTERNATIONAL BUSINESS MACHINES CORPORATION, Armonk, NY (US)

(72) Inventors: Gandhi Sivakumar, Melbourne (AU); Kushal S. Patel, Pune (IN); Luke Peter Macura, Lucas (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/248,055

(22) Filed: Jan. 7, 2021

(51) Int. Cl.
  *H04N 21/81* (2011.01)
  *H04N 21/438* (2011.01)
  *H04N 21/61* (2011.01)
(52) U.S. Cl.
  CPC ....... *H04N 21/812* (2013.01); *H04N 21/4383* (2013.01); *H04N 21/6131* (2013.01)
(58) Field of Classification Search
  None
  See application file for complete search history.

(56) References Cited

U.S. PATENT DOCUMENTS

| | | | |
|---|---|---|---|
| 2008/0010117 A1 | 1/2008 | Oliveira | |
| 2008/0114861 A1* | 5/2008 | Gildred | H04N 21/8456 709/219 |
| 2008/0255943 A1* | 10/2008 | Morten | G06Q 30/0269 705/14.53 |
| 2009/0076898 A1* | 3/2009 | Wang | G06Q 30/02 705/14.56 |
| 2009/0204664 A1* | 8/2009 | Yovin | H04N 21/858 709/203 |

(Continued)

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Michael H Hong
(74) *Attorney, Agent, or Firm* — Schmeiser, Olsen & Watts; Christopher M. Pignato

(57) ABSTRACT

A method, system, and computer program product for generating and presenting an offline video presentation is provided. The method includes executing service software code within a service orchestration and programmability framework layer of a telecom network. Communications with static and dynamic hardware and software resources are established and dynamic video presentations with respect to channels generated with respect to selective broadcast control channels of the telecom network are generated. Video contents of the dynamic video presentations are retrieved logical channels associated with virtual network functions are generated. Information associated with the video contents fare transferred from a channel to physical network functions of the telecom network. Connections associated with detecting offline video streams are allocated and a connection to a logical network is established. The video contents are associated with an offline video stream in response to the connection. The video contents are presented with the offline video stream.

20 Claims, 10 Drawing Sheets

(56) References Cited

U.S. PATENT DOCUMENTS

2015/0097683 A1    4/2015  Sloo

OTHER PUBLICATIONS

Alford, Emily; Offline video ads are a revenue opportunity most video providers are missing; https://www.clickz.com/offline-video-ads-opportunity/245269/; Jun. 25, 2019; 10 pages.

ericsson.com; Optimizing Network Applications for 5G; https://www.ericsson.com/en/news/2017/4/optimizing-network-applications-for-5g; Retrieved from the Internet Jan. 7, 2021; 1 page.

Low, Cherlynn; How 5G makes use of millimeter waves; https://www.engadget.com/2018-07-23-how-5g-makes-use-of-millimeter-waves.html Jul. 23, 2018; 14 pages.

Ranjan, Rakesh; Inserting Dynamic Ads into Downloadable Videos—Offline Video Advertising Simplified; https://www.muvi.com/blogs/inserting-dynamic-ads-into-downloadable-videos.html; Sep. 27, 2019; 6 pages.

Tyagi, Abhinav; How to Advertise offline?; https://medium.com/@abhi007tyagi/how-to-advertise-offline-546cbbc33eb8; Aug. 1, 2016; 3 pages.

* cited by examiner

OFFLINE VIDEO PRESENTATION

BACKGROUND

The present invention relates generally to a method for presenting an offline video stream and in particular to a method and associated system for improving video presentation hardware and software technology associated with generating dynamic video presentations and allocating and presenting an offline video stream with the video presentations.

SUMMARY

A first aspect of the invention provides an offline video presentation method comprising: executing, by a processor of a hardware device, service software code within a service orchestration and programmability framework layer of a telecom network; establishing, by the processor in response to the executing, communications with static and dynamic hardware and software resources; generating, by the processor in response to the communications, dynamic video presentations with respect to channels generated with respect to selective broadcast control channels of the telecom network; retrieving, by the processor, video contents of the dynamic video presentations via media access control (MAC) inbound or outbound communications of the telecom network; generating, by the processor, logical channels associated with virtual network functions (VNF); transferring, by the processor via the logical channels, information associated with the video contents from a dedicated traffic channel (DTCH) of the channels to physical network functions (PNF) of the telecom network; allocating, by the processor, the DTCH for connections associated with detecting offline video streams associated with the dynamic video presentations; connecting, by the processor, the DTCH to a logical network slice of the logical channels based on the PNF; associating, by the processor, the video contents with an offline video stream of the offline video streams in response to the connecting; and presenting, by the processor to a user via an interface, the video contents with the offline video stream in response to the associating.

A second aspect of the invention provides a computer program product, comprising a computer readable hardware storage device storing a computer readable program code, the computer readable program code comprising an algorithm that when executed by a processor of a hardware device implements an offline video presentation method, the method comprising: executing, by the processor, service software code within a service orchestration and programmability framework layer of a telecom network; establishing, by the processor in response to the executing, communications with static and dynamic hardware and software resources; generating, by the processor in response to the communications, dynamic video presentations with respect to channels generated with respect to selective broadcast control channels of the telecom network; retrieving, by the processor, video contents of the dynamic video presentations via media access control (MAC) inbound or outbound communications of the telecom network; generating, by the processor, logical channels associated with virtual network functions (VNF); transferring, by the processor via the logical channels, information associated with the video contents from a dedicated traffic channel (DTCH) of the channels to physical network functions (PNF) of the telecom network; allocating, by the processor, the DTCH for connections associated with detecting offline video streams associated with the dynamic video presentations; connecting, by the processor, the DTCH to a logical network slice of the logical channels based on the PNF; associating, by the processor, the video contents with an offline video stream of the offline video streams in response to the connecting; and presenting, by the processor to a user via an interface, the video contents with the offline video stream in response to the associating.

A third aspect of the invention provides a hardware device comprising a processor coupled to a computer-readable memory unit, the memory unit comprising instructions that when executed by the processor implements an offline video presentation method comprising: executing, by the processor, service software code within a service orchestration and programmability framework layer of a telecom network; establishing, by the processor in response to the executing, communications with static and dynamic hardware and software resources; generating, by the processor in response to the communications, dynamic video presentations with respect to channels generated with respect to selective broadcast control channels of the telecom network; retrieving, by the processor, video contents of the dynamic video presentations via media access control (MAC) inbound or outbound communications of the telecom network; generating, by the processor, logical channels associated with virtual network functions (VNF); transferring, by the processor via the logical channels, information associated with the video contents from a dedicated traffic channel (DTCH) of the channels to physical network functions (PNF) of the telecom network; allocating, by the processor, the DTCH for connections associated with detecting offline video streams associated with the dynamic video presentations; connecting, by the processor, the DTCH to a logical network slice of the logical channels based on the PNF; associating, by the processor, the video contents with an offline video stream of the offline video streams in response to the connecting; and presenting, by the processor to a user via an interface, the video contents with the offline video stream in response to the associating.

The present invention advantageously provides a simple method and associated system capable of accurately presenting an offline video stream.

DETAILED DESCRIPTION

Figure 1:
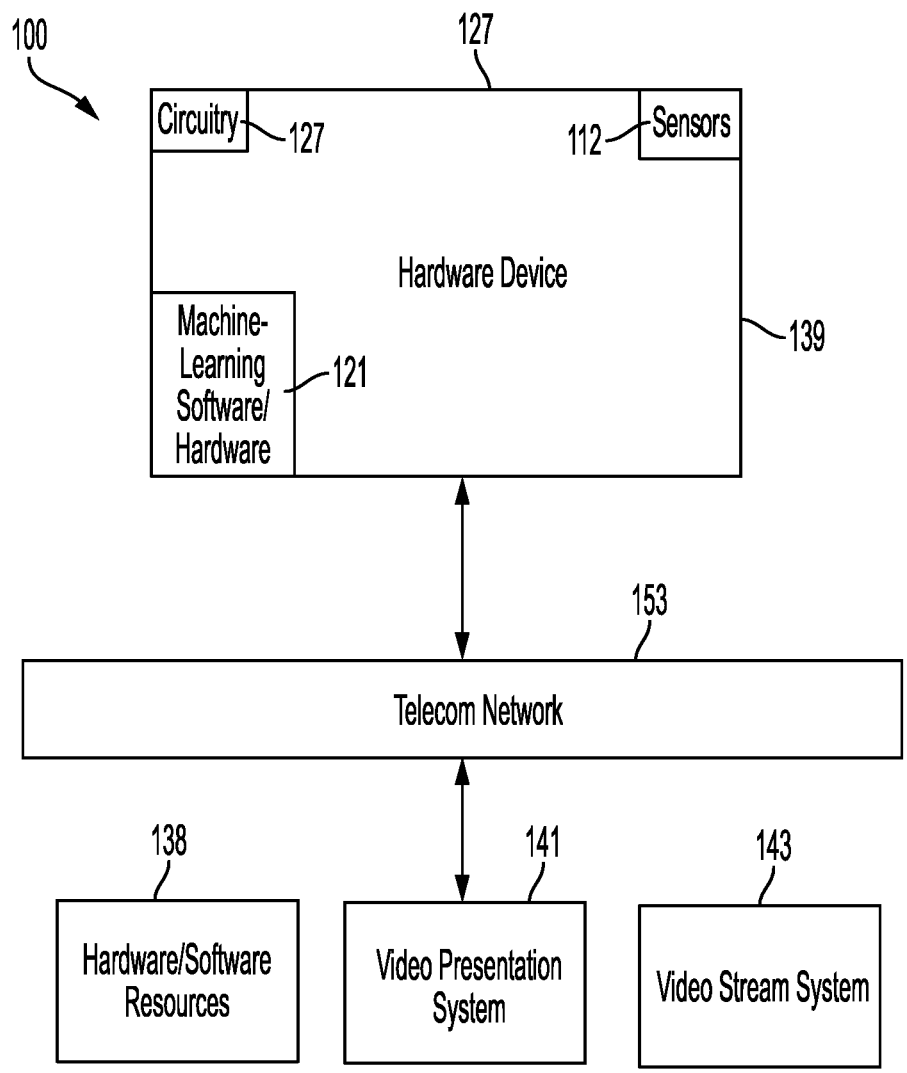
FIG. 1 illustrates a system for improving video presentation hardware and software technology associated with generating dynamic video presentations and allocating and presenting an offline video stream with the video presentations, in accordance with embodiments of the present invention.

FIG. 1 illustrates a system 100 for improving video presentation hardware and software technology associated with generating dynamic video presentations and allocating and presenting an offline video stream with the video presentations, in accordance with embodiments of the present invention. Promotional videos (e.g., an advertisement) typically appear on television, online via the Internet, via mobile videogames, etc. Online promotional videos are typically associated with increased consumption via various social media platforms. Likewise, online promotional videos may be placed within spaces occurring between existing video frames during a timeframe occurring while a user is waiting to view a video. For example (during an online video viewing), a promotional video may be placed such that it is located at a position (in a streaming video) after a defined interval within embedded video frames that may not be skipped. Current promotional video presentation systems are configured to locate the promotional videos during an online video presentation process occurring within social media or video library interfaces. Typical promotional videos may only be available for online content viewing only during an online mode of operation and may not be capable of being injected within downloaded video content in effective fashion. For example, when promotional video contents are downloaded for offline viewing, there may be no efficient means for dynamically placing promotional video contents within downloaded video content during a user viewing initialization process. Likewise, if video content is downloaded and an associated presentation process is initiated, typical promotional video presentation systems may be unable to place real time promotional video contents into the downloaded video content thereby causing lag times with respect to providing real time dynamic channel monitoring and current promotional video contents. Furthermore, typical promotional video presentation systems lack the flexibility to select specified promotional video contents based on the real time subscription and time-based relevance. Advances in 5G technology and dedicated traffic channels and traffic class separation enables retrieval of real time promotional video presentations for placement within downloaded video content during an offline presentation process. Therefore, system 100 enables a process for engaging 5G-dedicated traffic channel (DTCH) processes for retrieving and synchronizing real time promotional videos (e.g., advertisements) for placement within downloaded video contents or streams with respect to last mile delivery locations for increasing promotional video presentation during offline presentations. Likewise, system 100 enables 5G-DTCH based polling with respect to bulletin board channels for synchronization with pre-downloaded video contents embedded for real time validated content delivery with respect to downloaded video streams. Additionally, system 100 5G DTCH enables processes with respect to an offline video advertisement domain.

System 100 of FIG. 1 includes a hardware device 139 (i.e., specialized hardware), hardware/software resources 138, a video presentation system 141, and a video stream system 143 interconnected through a telecom network 153. Video presentation system 141 may comprise any type of system capable of providing promotional video presentations such as advertisements. Video stream system 143 may comprise any type of system capable of providing promotional stream presentations such as movies, TV shows, etc. Hardware device 139 includes specialized circuitry 127 (that may include specialized software), sensors 112, and machine learning software code/hardware structure 121 (i.e., including machine learning software code). Sensors 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Telecom network 153 may include any type of telecommunication network including, inter alia, a 5G telecom network associated with mobile device communications. Hardware/software resources 138 comprise any type of hardware or software resources requiring telecom communications and may include, inter alia, mobile phones, software systems, computers, etc. Hardware/software resources 138 may be Bluetooth enabled to provide connectivity to each other and any type of system. Hardware device 139 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware device 139 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving video presentation hardware and software technology associated with generating dynamic video presentations and allocating and presenting an offline video stream with the video presentations.

System 100 enables a process for communicating with a video presentation application within last mile delivery equipment (e.g., 5G-mobile devices) for detecting an offline video presentation and aligning real time bulletin-board delivery channel contents to the offline video presentation for injecting a video advertisement based on a tag identification process. System 100 comprises instances of service components running with respect to deployment. A client instance is enabled to run as part of a device operating system for last mile delivery location services for integration with a video presentation application for coordination with advertising systems associated with offline video contents.

A service instance s executed with respect to a 5G service orchestration layer for communications with a virtual network function (VNF) to generate logical channels for virtual bulletin-boards. The logical channels comprise multiple dedicated logical channels created by a virtual network function of a 5G telecom network. The dedicated logical channels broadcasted to all physical network functions associated with VNF. An announcement dedicated traffic channel (DTCH) is configured to replicate a content broadcast control channel (BCCH) within a telecom network. All the subscriber client systems will DTCH_CONNECT to dedicated logical channels to retrieve dynamic contents runtime. System 100 further includes a subscription-oriented model to create the DTCH and content delivery for various bulletin channels for video advertisement content retrieval. Video fillings (of the bulletin-DTCHs) are selected and pushed based on advertisements and a selection policy defined at a service orchestration layer of the 5G architecture. The service instance comprises a mechanism for price and frequency-based monitoring of subscribed advertisement agents within a programmability framework. The contents for the agents are collected using in-band a media access control (MAC) based message exchange enabled over a platform message queue and saved within a relation data store. Video advertisements are selected based on defined selection polices (typically dependent on payment of the agent, length, and additional aspects).

When a user downloads any video content (enabled for an offline advertisement), the video content is downloaded with additional metadata comprising digital tags for advertisement slots. The video content includes internal gaps within associated video frames occurring after a defined time interval. The digital tags are embedded within the video frames to generate trigger points for advertisement start points with the approximate timelines of the advertisements. An agent daemon running within the operating system of the last mile delivery location detects an offline play initiation event for ensuring all metadata and tagging information for the offline downloaded video currently being presented. When the agent daemon detect that online advertisement pushing is enabled for the content being played, the respective bulletin-DTCH is scanned and a user interface (UE) connects to an associated device. All information retrieved from the real time advertisement is captured within a temp space of the device operating systems and a tag polling process is initiated. Likewise, an advertisement for a respective timeline is gathered from a suitable announcement board based on timeline constraints and event context. When an advertisement tag is located by the client daemon, the pre-downloaded advertisement is injected in between a video frame and associated information is updated to the service instance to monitor for TRP of the advertisements. When a current lot is completed, a polling thread detects a next tag slot within the video contents. The agent daemon is disabled and transferred to a SLEEP thread when the offline video has completed its presentation. All bulletin board 5G-DTCH are released by the device and memory resources of the 5G DTCH are freed up in combination with a cleaning of temp space for future utilization.

As advertisements are pushed to the offline downloaded videos based on a nature and the context of audience, real time information will be available for a consumer to enable an increase of the consumption of an associated video advertisement thereby allowing for integration into offline video presentation systems. Subsequently, each user may be presented with differing advertisements based on age, location, geographical zones and additional insights for enabling user satisfaction in combination with more relevance with respect to advertisements for targeted and increased sales for business owners.

Figure 2:
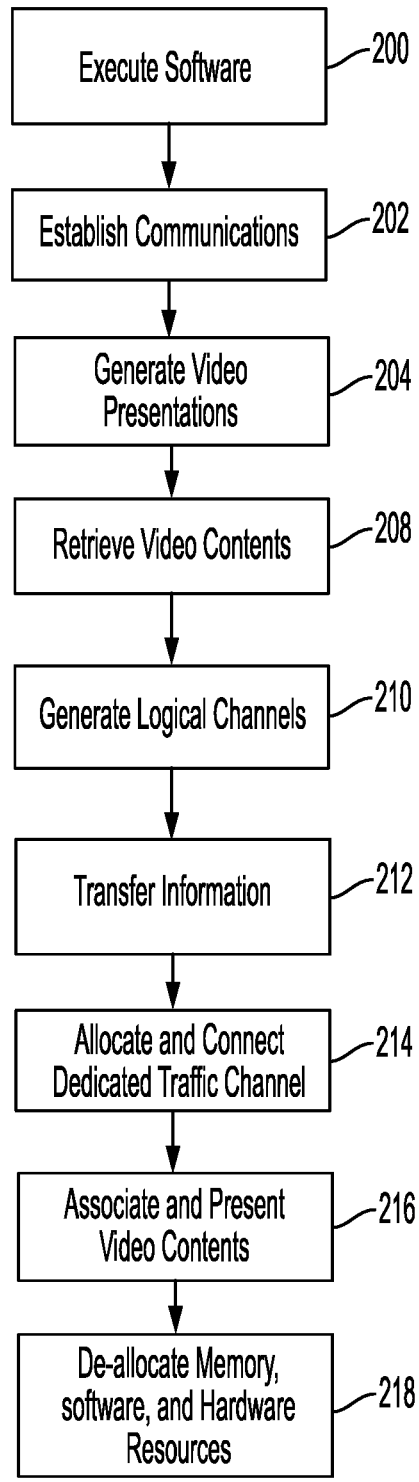
FIG. 2 illustrates an algorithm detailing a process flow enabled by the system of FIG. 1 for improving video presentation hardware and software technology associated with generating dynamic video presentations and allocating and presenting an offline video stream with the video presentations, in accordance with embodiments of the present invention.

FIG. 2 illustrates an algorithm detailing a process flow enabled by system 100 of FIG. 1 for improving video presentation hardware and software technology associated with generating dynamic video presentations and allocating and presenting an offline video stream with the video presentations, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed by hardware device 139. In step 200, service software code within a service orchestration and programmability framework layer of a telecom network (e.g., a 5G telecom network) is executed. In step 202, communications with static and dynamic hardware and software resources are established in response to results of step 200. In step 204, dynamic video presentations are generated with respect to channels generated with respect to selective broadcast control channels of the telecom network. In step 208, video contents of the dynamic video presentations are retrieved via media access control (MAC) inbound or outbound communications of the telecom network. The video contents may include advertisement data associated with the user. A process for retrieving the video contents may be executed during a current video presentation process.

In step 210, logical channels associated with virtual network functions (VNF) are generated. The virtual network functions may be associated with a specified bandwidth of an infrastructure executing the virtual network functions. In step 212, information associated with the video contents are transferred (via the logical channels) from a dedicated traffic channel (DTCH) to physical network functions (PNF) of the telecom network. Transferring the information may include: retrieving characteristics of the DTCH; and mapping the channels to a datastore associated with the virtual network functions. Additionally, non-guaranteed bit rate (GBR) modes associated with the PNF may be selected. Metadata and associated channel data may be extracted from the video contents and a channel identification for the DTCH with respect to the PNF may be retrieved based on the metadata.

In step 214, the DTCH is allocated for connections associated with detecting offline video streams associated with the dynamic video presentations. Additionally, the DTCH is connected to a logical network slice of the logical channels based on the PNF. In step 216, the video contents are associated with an offline video stream of in response to the connection. The video contents in combination with the offline video stream are presented to a user via an interface. Additionally, video tags associated with the video contents may be encoded and the video tags may be executed for the presentation.

In step 218, memory, software, and hardware resources are deallocated from the DCTH connected to the logical network slice in response to completion of the presentation of step 216.

Figure 3:
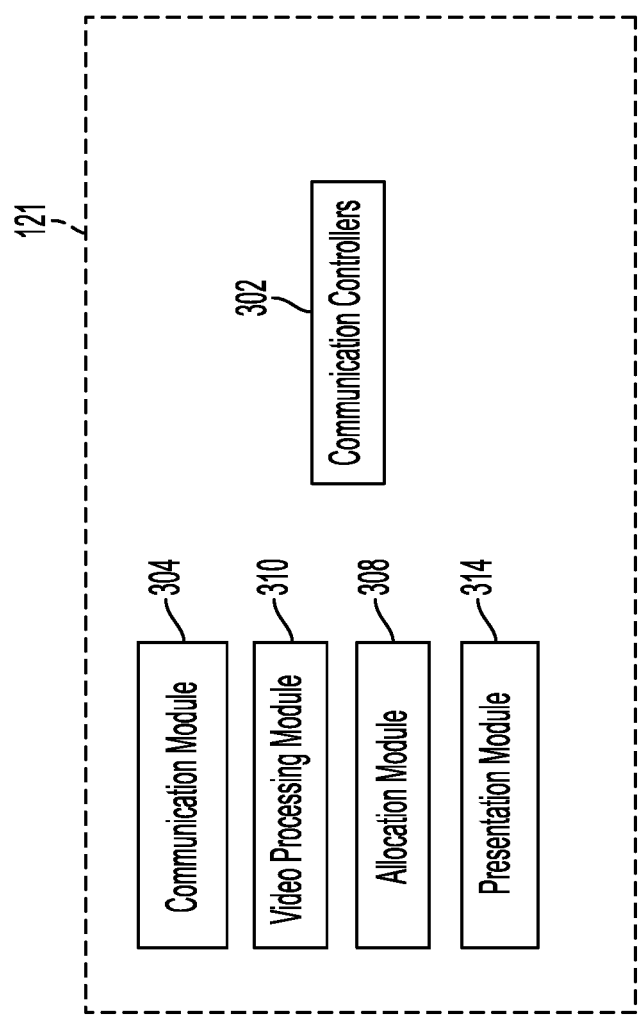
FIG. 3 illustrates an internal structural view of the machine learning software/hardware structure and/or the circuitry of FIG. 1, in accordance with embodiments of the present invention.

FIG. 3 illustrates an internal structural view of machine learning software/hardware structure 121 (and/or circuitry 127) of FIG. 1, in accordance with embodiments of the present invention. Machine learning software/hardware structure 121 includes a communication module 304, a video processing module 310, an allocation locating module 308, a presentation module 314, and communication controllers 302. Communication module 304 comprises specialized hardware and software for controlling all functions related to the communication steps of FIGS. 1 and 2. Video processing module 310 comprises specialized hardware and software for controlling all functionality related control of video processing functionality for implementing the process described with respect to the algorithm of FIG. 2. Allocation module 308 comprises specialized hardware and software for controlling all functions related to the allocation steps of FIG. 2. Presentation module 314 comprises specialized hardware and software for controlling all functions related presenting video streams as described, supra. Communication controllers 302 are enabled for controlling all communications between communication module 304, video processing module 310, allocation locating module 308, and presentation module 314.

FIGS. 4A-4D illustrate a multiservice platform hardware/software structure, in accordance with embodiments of the present invention.

Figure 4A:
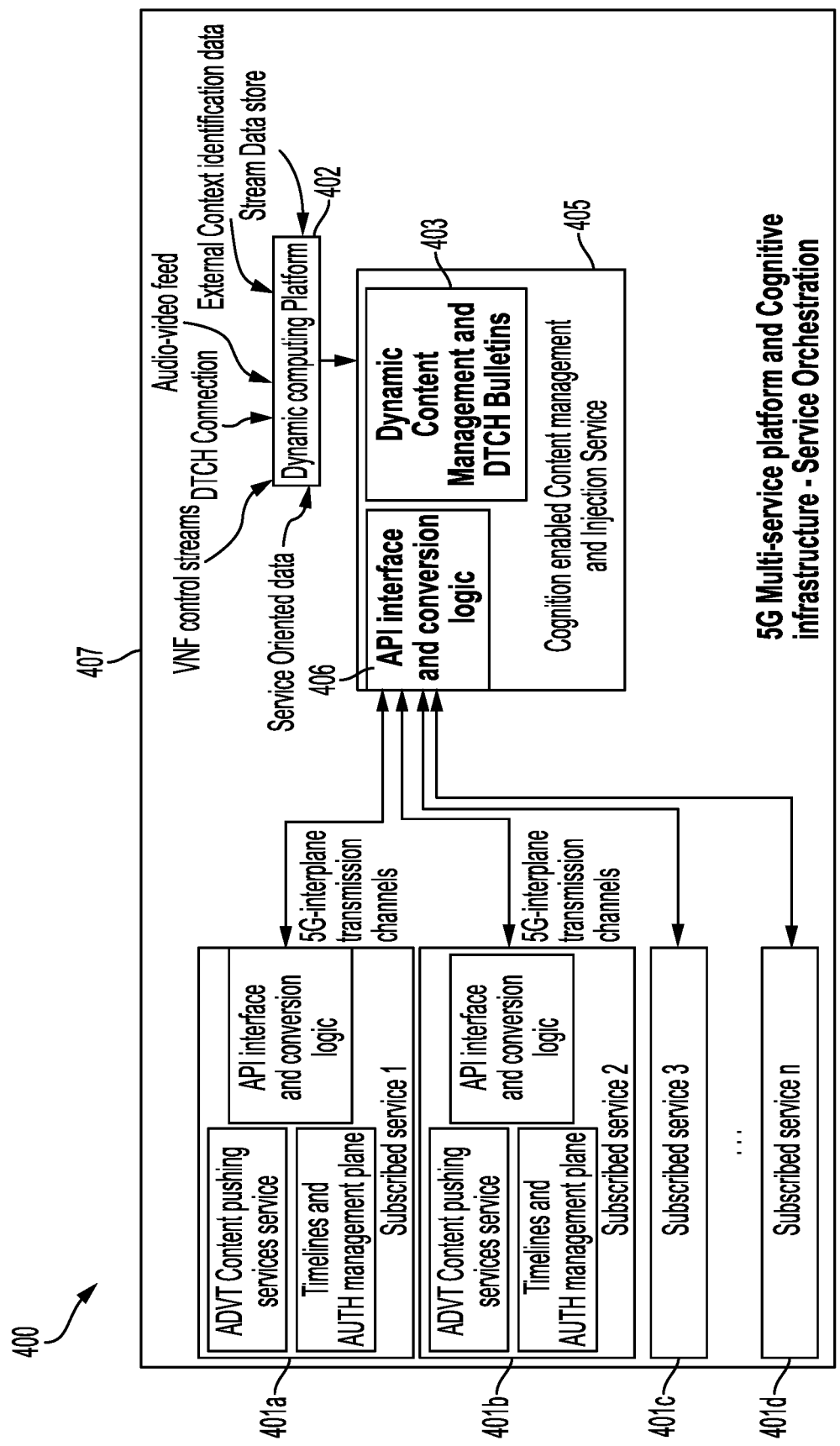
FIGS. 4A-4D illustrate a multiservice platform hardware/software structure, in accordance with embodiments of the present invention.

FIG. 4A illustrates a service orchestration and programmability framework layer 407 of 5G telecom network 400. 5G telecom network 400 comprises services 401a . . . 401d running within service orchestration and programmability framework layer 407. Services 401a . . . 401d is configured to communicate with all static and dynamic resources 402 placed within subscribed lists 405 to generate dynamic advertisements over bulletin board channels created over selective broadcast control channels (BCCH) 403 connected to an application programming interface (API) 406. Service orchestration and programmability framework layer 407 comprises a collection of the advertisement policies, price, timelines modelling and generation of relational information for subscriber-oriented advertisement allocation for the bulletin board channels.

Service orchestration and programmability framework layer 407 further comprises hardware and software for initializing multiple advertisement boards for data stream functionality based on a location, a type of fillers, and allocation to a relational mapper associated with an advertisement push. Service orchestration and programmability framework layer 407 enables a process for gathering advertisement video contents using MAC based in-bound or out-of-bound communication structures via usage of 5G inter-service communication. Service orchestration and programmability framework layer 407 further enables a process for selecting a platform message for establishing communication between services 401a . . . 401d for advertisement content gathering and response framework. A platform-based message queue utilization structure may be enabled for executing message exchange and PDU exchange over an S1 bearer.

Figure 4B:
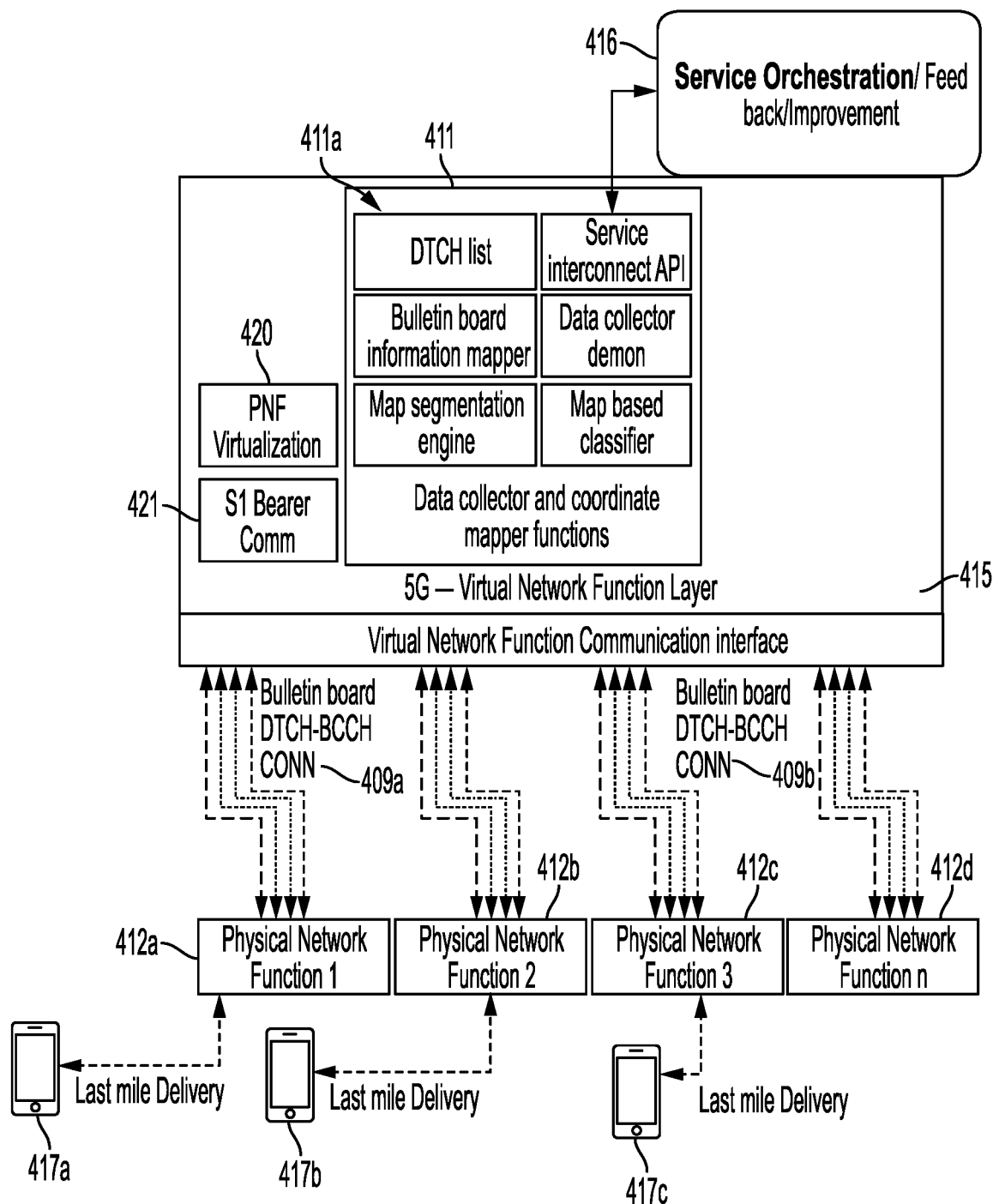

FIG. 4B illustrates an internal view of a virtual network function (VNF) layer 415 of 5G telecom network 400 of FIG. 4A. VNF layer 415 enables a process for creating bulletin board logical channels implementing VNF functions 411 with respect to a service orchestration framework 416. VNF layer 415 is configured to allocate VNF infrastructure resources 411a associated with PNF virtualization 420, an S1 bearer component 421, a network bandwidth, and computational resources to create a DTCH for dispatch boards. VNF layer 415 is further configured to allocate unique DTCH universally unique identifiers (UUID) for bulletin boards 409a and 409b for composing dynamic advertisement pushing to last mile delivery 417a . . . 717c. Additionally, DTCH information is transmitted to each respective PNF 412a . . . 412d based on associated policies. The aforementioned transmission process includes:
1. Gathering DTCH characteristics and PNFs to be identified.
2. Mapping location specific and audience concentrated channels with a local VNF data store for filtering PNFs.
3. Pushing DTCH allocation information to the PNFs for connectivity establishment VNF layer 415 is further configured to gather the DTCH_UUID and related negotiation parameters such as, inter alia, bandwidth and QCI characteristics using VNF-PNF interconnect APIs for storing associated information with in PNFs 412a . . . 412d for UE connections. Non-GBR modes are selected for communication interfaces used for bulletin board content management for updates to PNFs 412a . . . 412d.

Figure 4C:
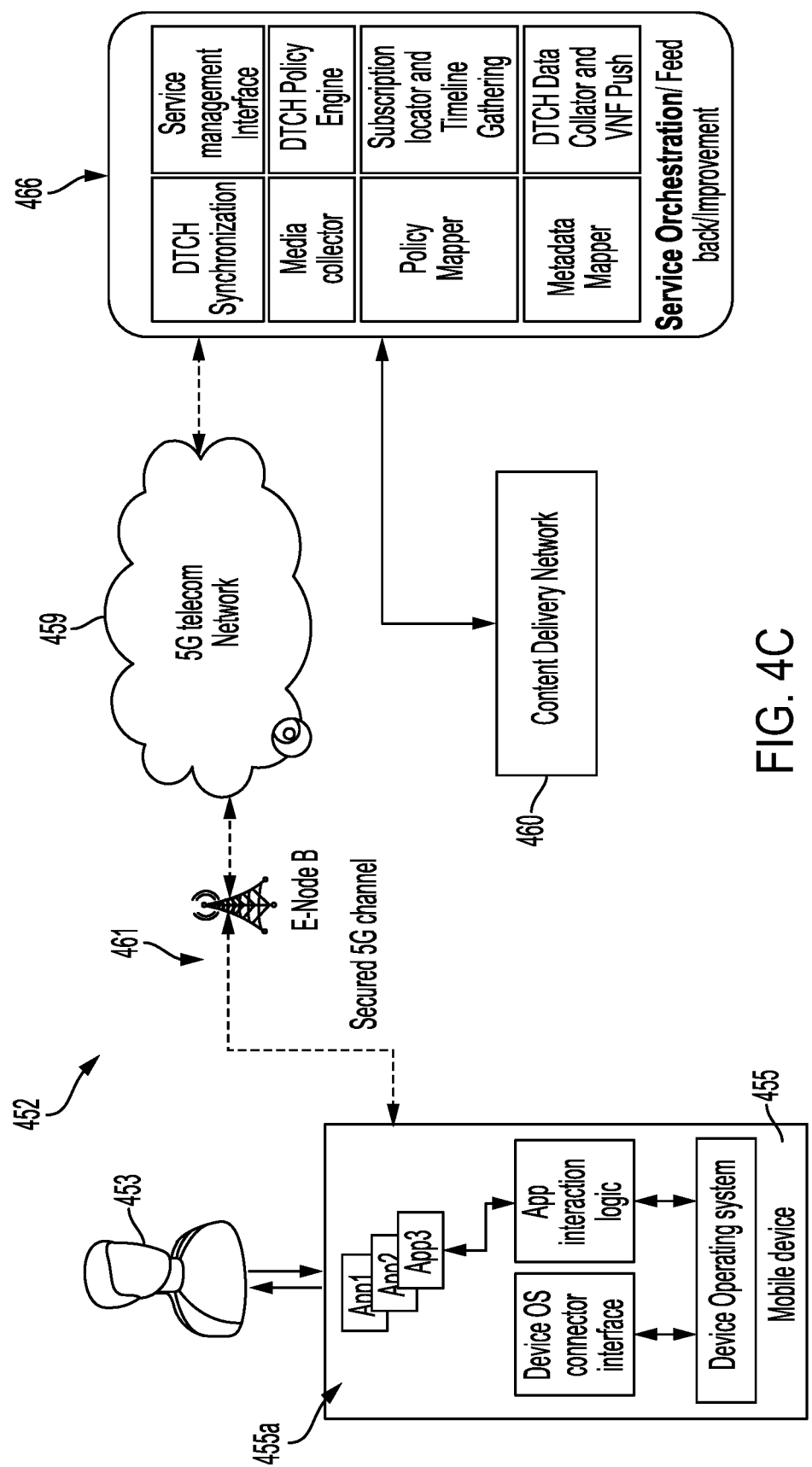

FIG. 4C illustrates a mobile device communication structure 452 of a 5G telecom network 459. Mobile device communication structure 452 enables DTCH allocation with respect to eNodeB and S1 bearer components 461 for associated DTCH being allocated from a service orchestration and programmability framework of telecom network 459. Mobile device communication structure 452 comprises client instance 453 comprising a polling thread of a mobile device 455 for monitoring a video play INIT signal. Client instance 453 further comprises encoding components 455 for enabling video tags 466 with respect to a content delivery network 460. Additionally, tags within a video are located for offline presentation of the video.

Figure 4D:
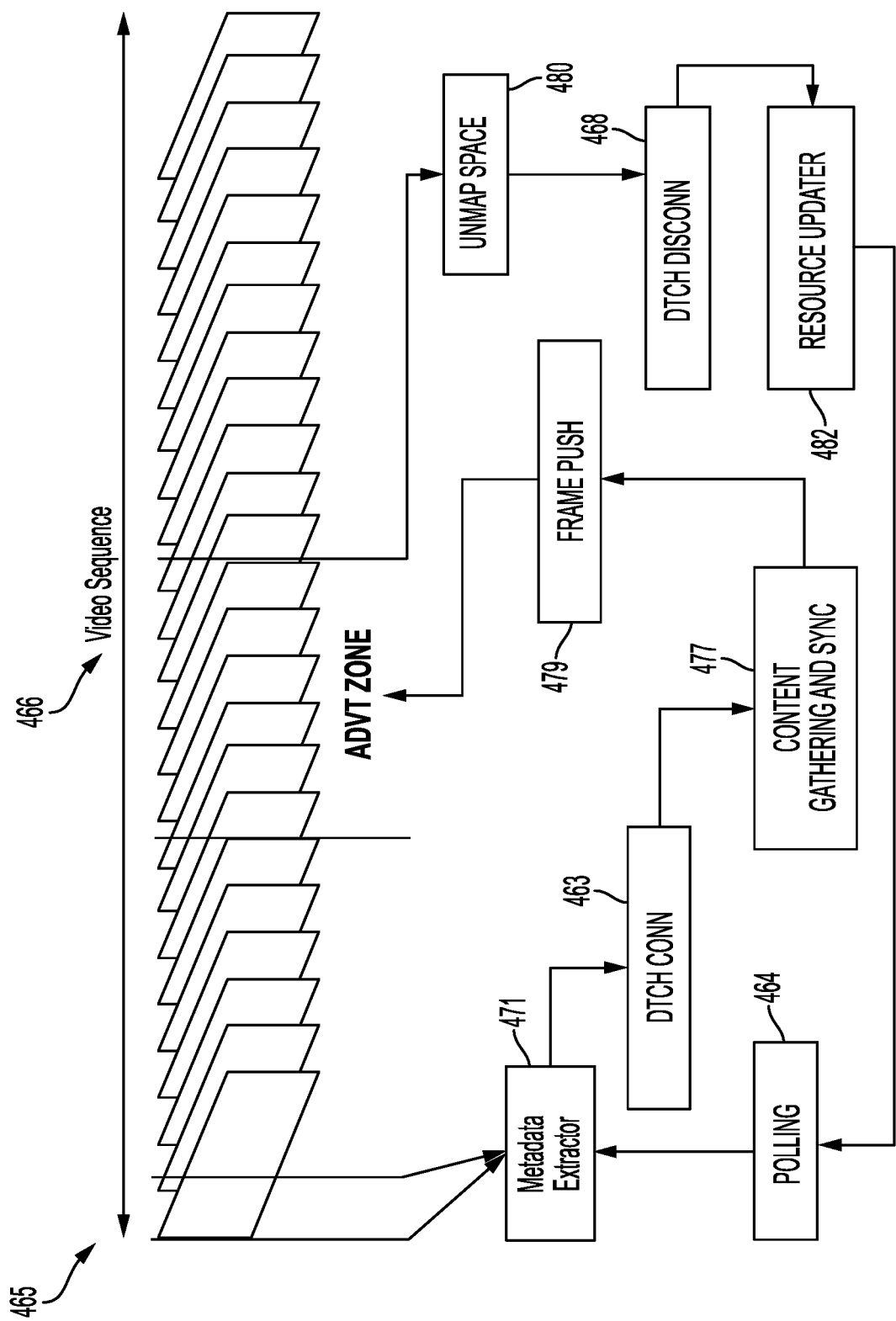

FIG. 4D illustrates polling process 465 of telecom network 400 of FIG. 4A. 9. The polling process 465 implements a polling structure 469 for offline video play detection of a video sequence 466 and triggering logic for DTCH connection establishment with a respective channel. Polling process further detects a video play start event and triggers an information to logical channel connector module 463 for DTCH connection establishment. Video metadata and channel information are extracted via metadata extractor component 471 via polling component 469. Bulletins are extracted a channel ID is retrieved from PNF functions via frame push component 479. Additionally, PNF data is pulled with respect to associated channel information and a DTCH_CONNECT command is initiated for a specific logical network slice. A content gathering and sync component 477 is configured to generate a channel and gather video contents during a current video presentation.

Polling process 465 further comprises locating tags for advertisements in offline content delivery and detecting a tag for pushing current media content received over a respective selected BCCH-DCCH network slice of a 5G telecom network. Memory and computation resources for the DTCH connection are deallocated (via unmap space component 480) when all tags are located and associated bulletins are downloaded. Contents are deleted from temp memory space via DTCH_DISCONNECT component 468 and resource updater component 482.

Figure 5:
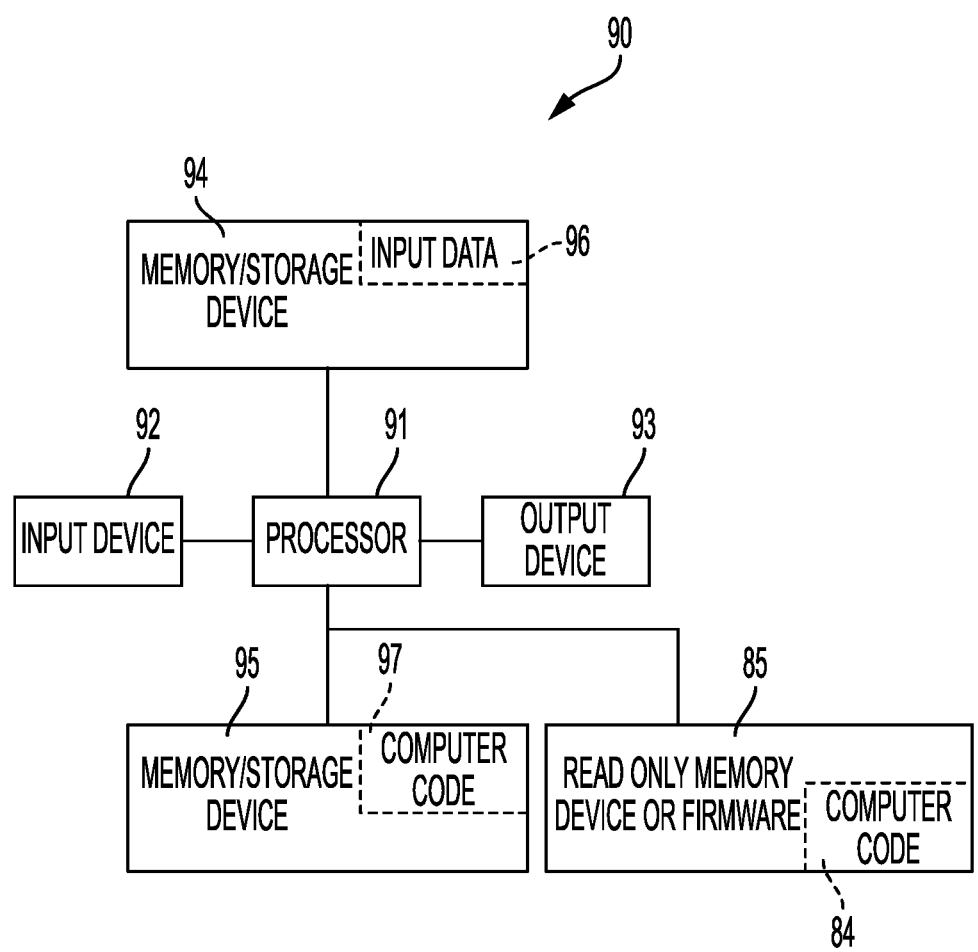
FIG. 5 illustrates a computer system used by the system of FIG. 1 for improving video presentation hardware and software technology associated with generating dynamic video presentations and allocating and presenting an offline video stream with the video presentations, in accordance with embodiments of the present invention.

FIG. 5 illustrates a computer system 90 (e.g., hardware device 139 of FIG. 1) used by or comprised by the system of FIG. 1 for improving hardware and software technology associated with detecting, evaluating, and normalizing periodic electrical signals of an apparatus for detecting and repairing potential hardware and software issues associated with operating the apparatus, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving video presentation hardware and software technology associated with generating dynamic video presentations and allocating and presenting an offline video stream with the video presentations. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve video presentation hardware and software technology associated with generating dynamic video presentations and allocating and presenting an offline video stream with the video presentations. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving video presentation hardware and software technology associated with generating dynamic video presentations and allocating and presenting an offline video stream with the video presentations. In another embodiment, the invention provides a business method that performs the process steps of the invention on a subscription, advertising, and/or fee basis. That is, a service supplier, such as a Solution Integrator, could offer to enable a process for improving video presentation hardware and software technology associated with generating dynamic video presentations and allocating and presenting an offline video stream with the video presentations. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
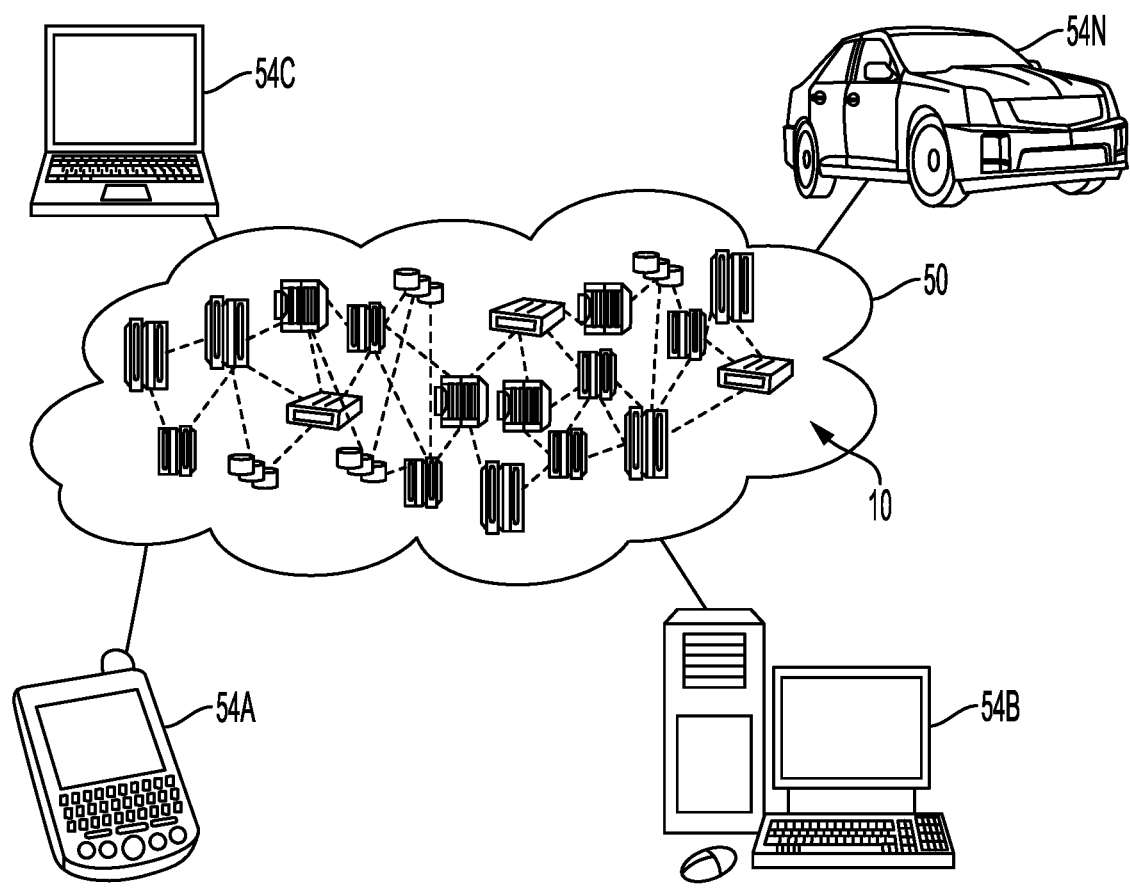
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
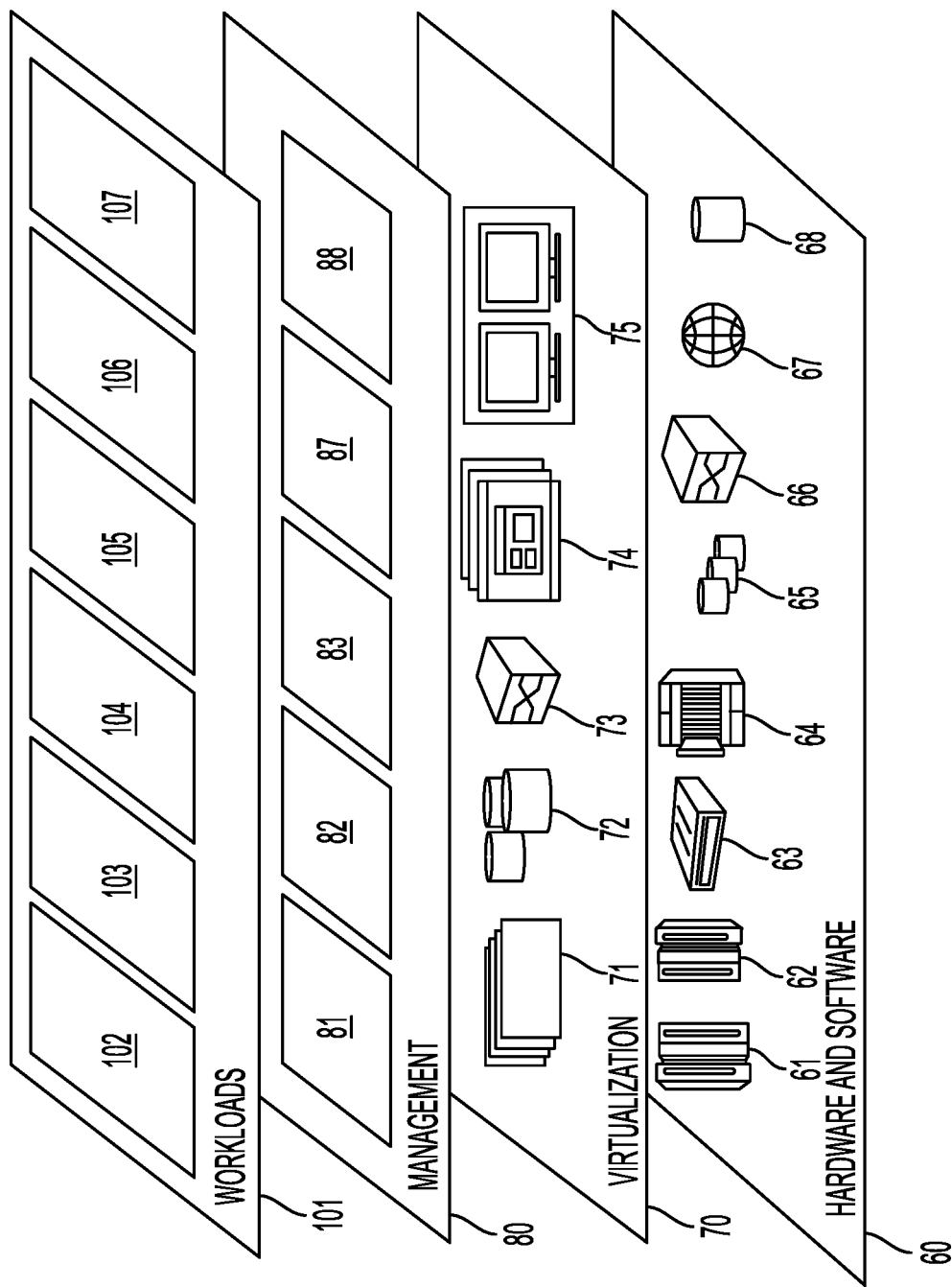
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving video presentation hardware and software technology associated with generating dynamic video presentations and allocating and presenting an offline video stream with the video presentations 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An offline video presentation method comprising:
   executing, by a processor of a hardware device, service software code within a service orchestration and programmability framework layer of a telecom network;
   establishing, by said processor in response to said executing, communications with static and dynamic hardware and software resources;
   generating, by said processor in response to said communications, dynamic video presentations with respect to channels generated with respect to selective broadcast control channels of said telecom network;
   retrieving, by said processor, video contents of said dynamic video presentations via media access control (MAC) inbound or outbound communications of said telecom network;

generating, by said processor, logical channels associated with virtual network functions (VNF);

transferring, by said processor via said logical channels, information associated with said video contents from a dedicated traffic channel (DTCH) of said channels to physical network functions (PNF) of said telecom network;

allocating, by said processor, said DTCH for connections associated with detecting offline video streams associated with said dynamic video presentations;

connecting, by said processor, said DTCH to a logical network slice of said logical channels based on said PNF;

associating, by said processor, said video contents with an offline video stream of said offline video streams in response to said connecting; and presenting, by said processor to a user via an interface, said video contents with said offline video stream in response to said associating.

2. The method of claim 1, wherein said telecom network comprises a 5G telecom network.

3. The method of claim 1, wherein said video contents comprises advertisement data associated with said user.

4. The method of claim 1, wherein said VNF are associated with a specified bandwidth of an infrastructure executing said VNF.

5. The method of claim 1, wherein said transferring said information comprises:
retrieving, characteristics of said DTCH; and
mapping said channels to a datastore associated with said VNF.

6. The method of claim 1, further comprising:
selecting, by said processor, non-guaranteed bit rate (GBR) modes associated with said PNF.

7. The method of claim 1, further comprising:
encoding, by said processor, video tags associated with said video contents; and
locating, by said processor, said video tags for executing said presenting.

8. The method of claim 1, further comprising:
extracting, by said processor from said video contents, metadata and associated channel data; and
retrieving, by said processor based on said metadata, a channel identification for said DTCH with respect to said PNF.

9. The method of claim 1, wherein said retrieving said video contents is executed during a current video presentation process.

10. The method of claim 1, further comprising:
deallocating, by said processor, memory, software, and hardware resources from said DCTH connected to said logical network slice in response to completion of said presenting.

11. The method of claim 1, further comprising:
providing at least one support service for at least one of creating, integrating, hosting, maintaining, and deploying computer-readable code in the hardware device, said code being executed by the computer processor to implement: said executing, said establishing, said generating said dynamic video presentations, said retrieving, said generating said logical channels, said transferring, said allocating, said connecting, said associating, and said presenting.

12. A computer program product, comprising a computer readable hardware storage device storing a computer readable program code, said computer readable program code comprising an algorithm that when executed by a processor of a hardware device implements an offline video presentation method, said method comprising:

executing, by said processor, service software code within a service orchestration and programmability framework layer of a telecom network;

establishing, by said processor in response to said executing, communications with static and dynamic hardware and software resources;

generating, by said processor in response to said communications, dynamic video presentations with respect to channels generated with respect to selective broadcast control channels of said telecom network;

retrieving, by said processor, video contents of said dynamic video presentations via media access control (MAC) inbound or outbound communications of said telecom network;

generating, by said processor, logical channels associated with virtual network functions (VNF);

transferring, by said processor via said logical channels, information associated with said video contents from a dedicated traffic channel (DTCH) of said channels to physical network functions (PNF) of said telecom network;

allocating, by said processor, said DTCH for connections associated with detecting offline video streams associated with said dynamic video presentations;

connecting, by said processor, said DTCH to a logical network slice of said logical channels based on said PNF;

associating, by said processor, said video contents with an offline video stream of said offline video streams in response to said connecting; and presenting, by said processor to a user via an interface, said video contents with said offline video stream in response to said associating.

13. The computer program product of claim 12, wherein said telecom network comprises a 5G telecom network.

14. The computer program product of claim 12, wherein said video contents comprises advertisement data associated with said user.

15. The computer program product of claim 12, wherein said VNF are associated with a specified bandwidth of an infrastructure executing said VNF.

16. The computer program product of claim 12, wherein said transferring said information comprises:
retrieving, characteristics of said DTCH; and
mapping said channels to a datastore associated with said VNF.

17. The computer program product of claim 12, further comprising:
selecting, by said processor, non-guaranteed bit rate (GBR) modes associated with said PNF.

18. The computer program product of claim 12, wherein said method further comprises:
encoding, by said processor, video tags associated with said video contents; and
locating, by said processor, said video tags for executing said presenting.

19. The computer program product of claim 12, wherein said method further comprises:
extracting, by said processor from said video contents, metadata and associated channel data; and
retrieving, by said processor based on said metadata, a channel identification for said DTCH with respect to said PNF.

20. A hardware device comprising a processor coupled to a computer-readable memory unit, said memory unit comprising instructions that when executed by the processor implements an offline video presentation method comprising:

executing, by said processor, service software code within a service orchestration and programmability framework layer of a telecom network;
  establishing, by said processor in response to said executing, communications with static and dynamic hardware and software resources;
  generating, by said processor in response to said communications, dynamic video presentations with respect to channels generated with respect to selective broadcast control channels of said telecom network;
  retrieving, by said processor, video contents of said dynamic video presentations via media access control (MAC) inbound or outbound communications of said telecom network;
  generating, by said processor, logical channels associated with virtual network functions (VNF);
  transferring, by said processor via said logical channels, information associated with said video contents from a dedicated traffic channel (DTCH) of said channels to physical network functions (PNF) of said telecom network;
  allocating, by said processor, said DTCH for connections associated with detecting offline video streams associated with said dynamic video presentations;
  connecting, by said processor, said DTCH to a logical network slice of said logical channels based on said PNF;
  associating, by said processor, said video contents with an offline video stream of said offline video streams in response to said connecting; and
  presenting, by said processor to a user via an interface, said video contents with said offline video stream in response to said associating.

* * * * *